Nov. 24, 1942.   J. M. LUERS   2,302,783

TOOL HOLDER AND CUTTER

Filed July 21, 1941

INVENTOR.
John M. Luers
BY
Gerald S. Baldwin
Attorney.

Patented Nov. 24, 1942

2,302,783

UNITED STATES PATENT OFFICE 2,302,783

TOOLHOLDER AND CUTTER

John M. Luers, Mount Clemens, Mich., assignor to John Milton Luers Patents Incorporated, Detroit, Mich., a corporation of Michigan Application July 21, 1941, Serial No. 403,281

1 Claim. (Cl. 29—102)

This invention relates to improvements in toolholders and cutters, and refers particularly to means for positively holding the cutter relative to the holder.

Various types of cutters are provided with integral, laterally disposed shanks which are supported in a holder so that from time to time, as its cutting surface wears away and is reground, the cutter may be turned in the holder to retain the cutting surface substantially radial to the axis of the work. Due, however, to the pressure exerted upon the cutting surface by the work there is a possibility of the tool turning even if its shank is frictionally held.

It is an object of this invention to provide a toolholder and cutter construction including positive means for preventing rotation of the cutter in its holder to insure that the cutter will remain correctly positioned when in use.

Another object of the invention is to provide a toolholder and cutter including a screw extending through a holder opening into the bore of the holder wherein the shank of the cutter is supported, and to provide teeth around the periphery of the shank to engage the screw so that when the screw is tightened against the holder rotation of the cutter cannot occur.

Having thus briefly and broadly stated some of the objects and advantages of the invention I will now describe a preferred embodiment thereof with the aid of the accompanying drawing, wherein.

Figure 1:
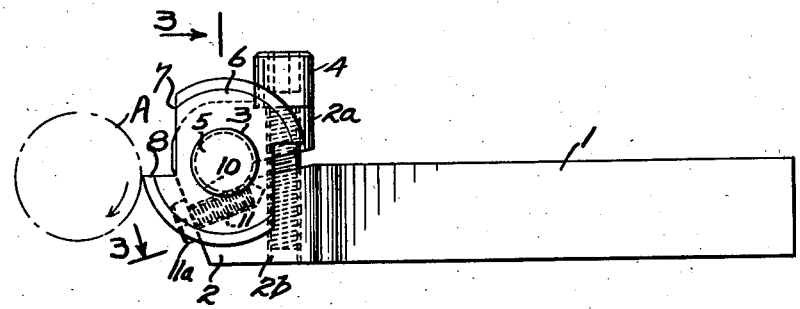
Figure 1 illustrates a side elevation of the invention.
Figure 2:
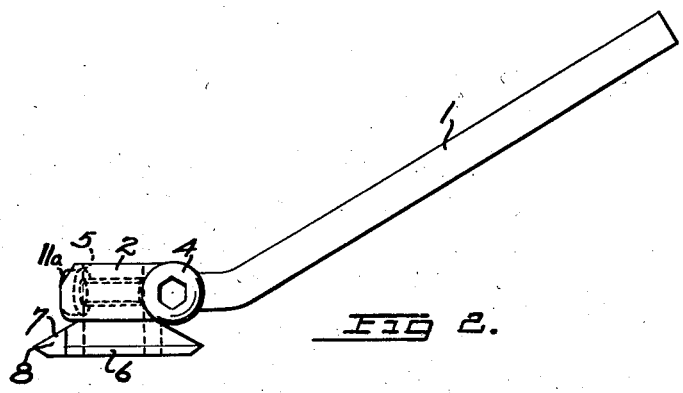
Figure 2 is a plan view thereof.
Figure 3:
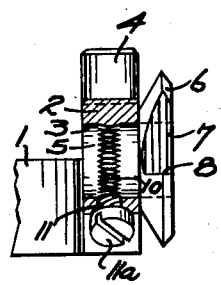
Figure 3 is a section on the line 3—3 of Figure 1.

The toolholder consists of a body portion 1 which is intended to be suitably supported in a machine (not shown), and terminates at one extremity in a split head 2 transversely through which an aperture 3 is provided. 4 denotes a screw extending freely through one portion 2a of the split head and in threaded engagement with the opposite portion 2b. Mounted in the aperture 3 is a shank 5 which projects laterally from and is integral and concentric with a cutter 6 which is substantially circular in form and has recesses 7 therein to provide cutting surfaces 8, one of which should be so disposed, when the cutter is in use, that it extends substantially radially to a workpiece A to be machined.

Obviously when the screw 4 is tightened the shank 5 is frictionally engaged by the wall of the aperture 3, however when heavy cuts are taken there is a possibility that the cutter may be turned in an anti-clockwise direction—Figure 1—thereby causing displacement of the cutting surface 8 relative to the work A. So in order to positively prevent rotation of the cutter the shank 5 is hobbed intermediately of its width to provide an annular arrangement of transversely disposed teeth 10 around its periphery. Mounted for free rotation in the head 2 is a locking screw 11 which engages the teeth 10 and extends at right angles to an imaginary line projecting radially from the axis of the shank 5 to the point of engagement of the locking screw 11 with the teeth 10. This screw is tightened so that its head 11a is in contact with the face of the head of the toolholder into which it extends. Then the locking screw positively prevents rotation of the shank 5 and cutter 6 which otherwise might be caused by pressure exerted upon the cutting surface 8 by the work A.

From the foregoing it will be seen that I have devised a simple and efficient means for positively preventing rotation of a cutter relative to its holder. It is also understood that alterations and modifications may be made to the form of construction shown and described, provided those alterations and modifications fall within the scope of the appended claim.

What I claim is:

A toolholder having a transversely apertured head, a cutter including a laterally disposed shank around the periphery of which transversely disposed teeth are provided, said apertured head being split transversely, means for drawing the split portions of the head together to grip the shank periphery, said head having an opening formed therethrough extending substantially from the shank receiving aperture, a screw extending freely into said opening and having an enlarged head located exteriorly of the head of the toolholder, said screw having its thread in engagement with the shank teeth so that when the screw is turned the shank remains stationary and when the screw head bears against the toolholder the shank and cutter are held immovable.

JOHN M. LUERS.